US007798121B2

United States Patent
Hellinger et al.

(10) Patent No.: US 7,798,121 B2
(45) Date of Patent: Sep. 21, 2010

(54) APPARATUS FOR DETECTING THE ANGLE OF ROTATION FOR A THROTTLE VALVE OPERATED BY MEANS OF AN ELECTRIC MOTOR

(75) Inventors: Leopold Hellinger, Ziersdorf (AT); Gerhard Neumann, St. Margarethen (AT)

(73) Assignee: MELECS EWS GmbH & Co KG, Siegendorf (AT)

( * ) Notice: Subject to any disclaimer, the term of this patent is extended or adjusted under 35 U.S.C. 154(b) by 0 days.

(21) Appl. No.: 12/311,149

(22) PCT Filed: Jul. 12, 2007

(86) PCT No.: PCT/EP2007/057161

§ 371 (c)(1),
(2), (4) Date: Jul. 10, 2009

(87) PCT Pub. No.: WO2008/034656

PCT Pub. Date: Mar. 27, 2008

(65) Prior Publication Data

US 2009/0283069 A1    Nov. 19, 2009

(30) Foreign Application Priority Data

Sep. 22, 2006  (DE) ................ 10 2006 044 855

(51) Int. Cl.
*F02D 11/04*   (2006.01)
*F02D 9/10*    (2006.01)
(52) U.S. Cl. ............... 123/337; 123/399; 123/403
(58) Field of Classification Search ............ 123/361, 123/336, 399, 403, 583, 584, 586; 324/207.25; 73/114.36
See application file for complete search history.

(56) References Cited

U.S. PATENT DOCUMENTS

| 5,301,646 | A  | * | 4/1994  | Doi et al. ............... 123/399 |
| 5,664,542 | A  | * | 9/1997  | Kanazawa et al. ........ 123/361 |
| 6,448,762 | B1 | * | 9/2002  | Kono et al. ............. 324/207.2 |
| 6,491,019 | B1 | * | 12/2002 | Apel ...................... 123/337 |
| 6,505,643 | B2 | * | 1/2003  | Scholten et al. .......... 137/554 |
| 6,575,427 | B1 | * | 6/2003  | Rauch et al. .............. 251/69 |
| 6,789,526 | B2 | * | 9/2004  | Torii et al. .............. 123/399 |
| 6,928,981 | B2 | * | 8/2005  | Garrick et al. ........... 123/337 |
| 7,032,569 | B2 | * | 4/2006  | Ikeda et al. ............. 123/399 |
| 7,096,851 | B2 | * | 8/2006  | Matsuda et al. .......... 123/399 |
| 2005/0022785 | A1 | | 2/2005 | Kurita |

FOREIGN PATENT DOCUMENTS

| DE | 4317259 C2    | 11/1993 |
| DE | 102005033693 A1 | 3/2006 |
| EP | 0337099 A2    | 10/1989 |
| EP | 1096235 A2    | 5/2001  |
| EP | 1417404 B1    | 5/2004  |
| EP | 1452757 A2    | 9/2004  |

\* cited by examiner

Primary Examiner—Stephen K Cronin
Assistant Examiner—Johnny H Hoang

(57) ABSTRACT

A device for detecting the angle of rotation of a throttle valve operated by an electric motor is disclosed. The valve is rotatably supported on a throttle valve shaft in an intake system of a throttle valve housing, wherein an actuator motor coupled to the throttle valve shaft predefines the throttle valve angular position in a manner controlled by a control unit, and wherein a predetermined value of the throttle valve angular position is predetermined by a manually operated predetermined-value input apparatus and is fed to the control unit. The predetermined-value input apparatus is coupled to a predetermined value sensor shaft, wherein the angular position of the predetermined value sensor shaft corresponds to the manually predefined predetermined value of the throttle valve angular position.

20 Claims, 3 Drawing Sheets

__APPARATUS FOR DETECTING THE ANGLE OF ROTATION FOR A THROTTLE VALVE OPERATED BY MEANS OF AN ELECTRIC MOTOR__

CROSS REFERENCE TO RELATED APPLICATIONS

This application is the U.S. National Stage of International Application No. PCT/EP2007/057161 filed Jul. 12, 2007, and claims the benefit thereof. The International Application claims the benefits of German Patent application No. 10 2006 044 855.3 DE filed Sep. 22, 2006, both of the applications are incorporated by reference herein in their entirety.

FIELD OF INVENTION

The invention relates to an apparatus for detecting the angle of rotation for a throttle valve operated by means of an electric motor, which is supported in a rotatable manner on a throttle valve shaft in an intake system of a throttle valve housing, with an actuator coupled to the throttle valve shaft predetermining the rotational position of the throttle valve subject to the control of an electronic control system and with a setpoint value of the rotational position of the throttle valve being able to be predetermined by means of a manually operatable setpoint value input apparatus and being supplied to the electronic control system.

BACKGROUND OF INVENTION

In modern motor vehicles the power of the motor is frequently regulated electronically. The quantity of fresh gas taken in by the motor is predetermined here by an electronic control unit which processes a plurality of operating parameters and generates a control signal for an actuator, which activates the throttle valve by way of a transmission system. It is thus possible for example to keep the power output of the motor within safe limit values or to keep the exhaust gas values within legally prescribed limits.

For the measurement-based detection of a setpoint power value required by the driver, transducers are known which are integrated in the throttle lever or gas pedal of a motor vehicle. However it is disadvantageous that such transducers require auxiliary energy and the generated measurement signal has to be routed to a remote electronic control system.

To detect the angle of rotation of a throttle valve shaft an apparatus is known from DE 101 39 994 B4, in which the end face of a semicircular permanent magnet arranged concentrically with a swivel axis is fixed on a toothed wheel. Hall sensors are arranged within the range of movement of this permanent magnet segment to detect the radial magnetic field on the outside and on the inside of the permanent magnet. However the radial detection of the magnetic field means that the Hall sensors can only be arranged in an upright position on the printed circuit board. Only a relatively large-volume type of component can be used. The use of miniaturized SMD Hall sensors is not readily possible. The electronic measuring system therefore requires a certain structural volume.

A power regulator for a motorcycle is described in DE 10 2005 029 862 A1, in which the required power is predetermined manually at the throttle lever and transmitted to the throttle valve shaft by way of a Bowden cable with an intermediate torsion spring. The actual position of the throttle valve is however determined by a power regulation module, which overrides the manually predetermined setting by way of an actuator operated by means of an electric motor in certain operating phases. In other words in these phases it is not the driver who determines the power output of the motor but the electronic system. The electronic system and servomotor are arranged at separate locations from the throttle valve body structurally speaking. This requires a separately sealed electronic system housing and motor housing and corresponding assembly space respectively. The electronic system only detects the rotational position of the throttle valve shaft, not the manually predetermined setpoint power value. In override phases therefore the electronic power regulation module does not know the manually predetermined setpoint power value.

SUMMARY OF INVENTION

An object of the invention is to specify an apparatus for detecting the angle of rotation for a throttle valve operated by means of an electric motor such that in every operating phase both the setpoint power value predetermined on the part of the driver and the actual value of the throttle valve position can be detected by measuring and that the measuring circuit takes up the smallest possible installation space so that integration with an electronic control system, a transmission unit and a servomotor is possible with a small structural volume and little outlay.

The invention is based on the idea of detecting the manually predetermined setpoint value and the actual value of a throttle valve position at the same time and at one measuring point. To this end the throttle valve shaft is configured as a hollow shaft. A setpoint value sensor shaft is supported in a rotatable manner in the hollow space of the throttle valve shaft. This setpoint value sensor shaft is connected mechanically to a manually operatable facility, for example a throttle lever or gas pedal of a motor vehicle in such a manner that the required setpoint power value is converted to a corresponding rotational position of the setpoint value sensor shaft. This "shaft in pipe" structure allows both the setpoint value of the required power and the actual value of the throttle valve position to be measured at the same time at a common end of these two shafts, i.e. at one measuring point, and these rotation-angle-dependent setpoint and actual power value signals to be provided for an electronic control system. Measurement can be based for example on a magnetic measuring principle. To this end permanent magnets can be arranged respectively at a common end of the two shafts, their magnetic field being detected by adjacently arranged magnetic field sensors, e.g. Hall sensors. As a result both items of information are present at the same time at one measuring point in the form of an electric signal. This is extremely advantageous for a power regulation, as power regulation can be undertaken in a highly differentiated manner.

In one structurally preferred embodiment the permanent magnets are configured as annular magnets, which are cost-effective.

With regard to signal detection it is advantageous if the annular magnets are embodied with two poles and axial magnetization.

In one preferred embodiment the magnetic field sensors are arranged using SMD technology on a main surface of a printed circuit board facing toward the end faces of the annular magnets. Large-volume, difficult to assemble Hall sensors of the THT type, as used until now, are no longer required. SMD Hall sensors require comparatively little structural volume. Automatic SMD component assembly is extremely advantageous for large-scale manufacture.

When the SMD magnetic field sensors and components of the electronic control system are arranged on a common printed circuit board, the relatively short electrical connecting lines mean that susceptibility to interference from interfering electromagnetic fields is reduced. The short connecting lines between the electronic control system and the magnetic field sensors mean there is no need for complex signal amplification. The sensor signals can be processed directly by a microprocessor or microcontroller in the electronic control system.

A redundant sensor arrangement is advantageous in respect of fail-safe operation. An arrangement is preferred, in which the magnetic field of each permanent magnet is detected by two magnetic field sensors, each arranged diametrically opposite one another on a circular line.

From a manufacturing point of view it is favorable if the permanent magnet of the measuring apparatus is configured as a single piece with a drive element supporting the permanent magnet. Such a structure allows a permanent magnet for example to be produced together with a toothed wheel or toothed segment wheel of the throttle valve shaft in one work step. Production can take place for example using twin-component injection molding technology. It is particularly advantageous, if magnetization of the permanent magnet injection-molded onto the drive element takes place in the injection molding mold.

A control cable or Bowden cable is suitable for the connection between the setpoint value sensor shaft and a manual turning handle or a gas pedal.

BRIEF DESCRIPTION OF THE DRAWINGS

To explain the invention further, reference is made in the part of the description which follows to the drawings, from which further advantageous embodiments, details and developments of the invention will emerge.

DETAILED DESCRIPTION OF INVENTION

Figure 1:
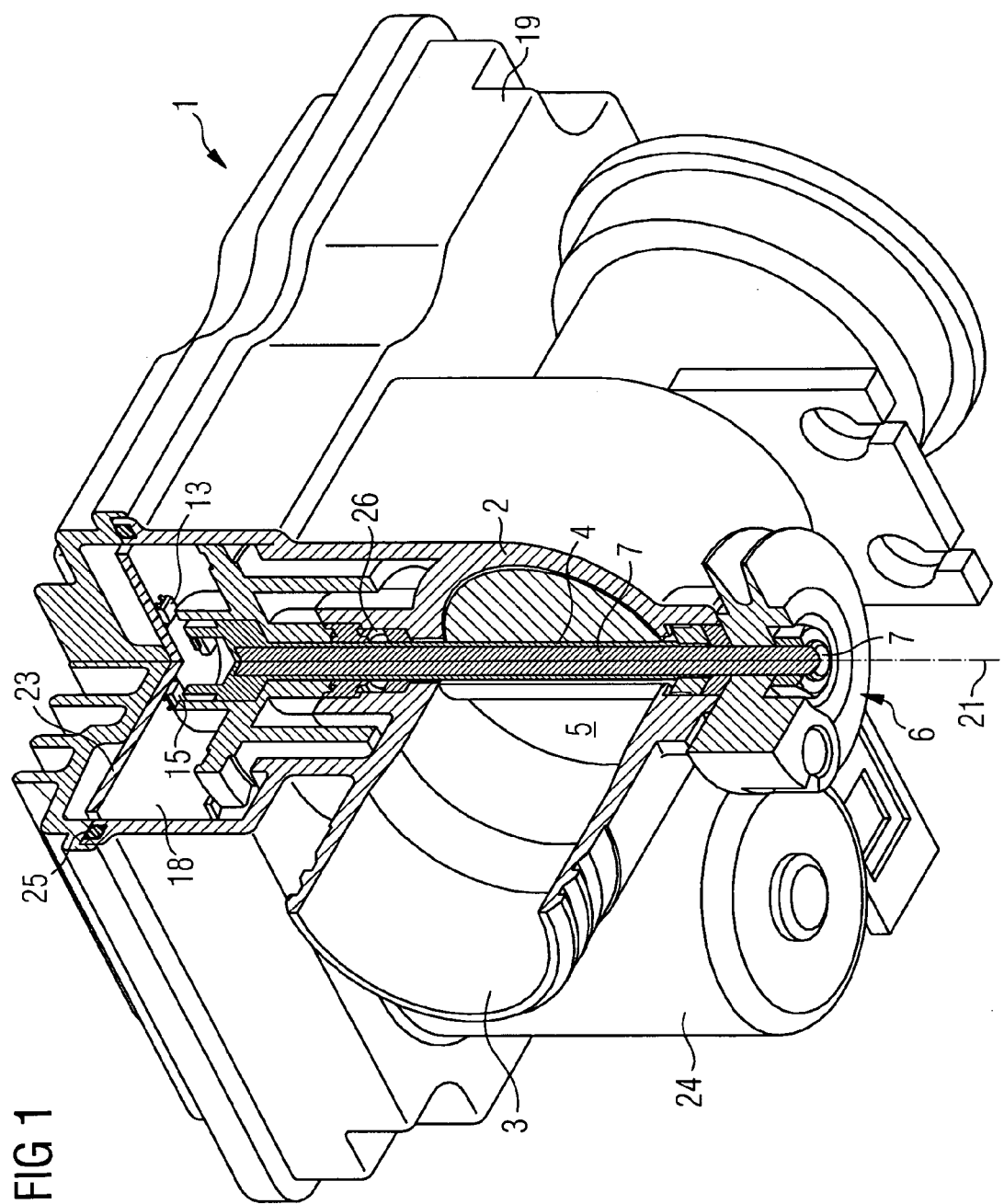
FIG. 1 shows a perspective view of a throttle valve operated by means of an electric motor, as used for a motorcycle, with a partially sectional diagram being shown for the purpose of explaining the rotation angle detection.

FIG. 1 shows a throttle valve operated by means of an electric motor, as used for example for a motorcycle, designated as a whole with the reference character 1.

A throttle valve 5 is located in a pipe-type intake system 3, being fixed on a throttle valve shaft 4 and being supported in a throttle valve housing 2 in a rotatable manner about an axis 21. An electric motor 24, of which only the outer housing contour can be identified in FIG. 1, drives the throttle valve shaft 4 by way of toothed wheels, which are explained below with reference to FIG. 2.

The partially sectional diagram in FIG. 1 shows that the throttle valve shaft 4 is configured as a hollow shaft with thin walls. The hollow shaft 4 is supported in the throttle valve housing in a rotatable manner about an axis 21. A setpoint value sensor shaft 7 is arranged coaxially inside the hollow shaft and is likewise supported in a rotatable manner about the axis 21 in the hollow shaft. One end of the setpoint value sensor shaft 7 (in the diagram in FIG. 1 the lower end) extends out of the throttle valve housing 2. A cable wheel 22 is fixed to this lower end of the shaft 7, being connected to a throttle lever of a motorcycle by way of a Bowden cable (not shown in detail). The required power of the internal combustion engine of the two-wheeled vehicle is predetermined manually at the throttle lever and converted by the facility shown as a whole with the reference character 6 in FIG. 1 to a rotational position of the setpoint value sensor shaft 7.

The respective other ends of the coaxial shafts 4 and 7 (in the diagram in FIG. 1 the upper end of the hollow shaft 4 and the upper end of the shaft 7) likewise extend out of the housing 2 on one side 26. The shaft stubs 4 and 7 project into the interior of an adjacent electronic system housing 18. An annular magnet 11, 12 is fixed to the end faces of each of these shaft ends 4, 7. SMD magnetic field sensors are located on a printed circuit board 23 adjacent to the end faces of these annular magnets 11, 12.

FIG. 1 shows only the sensors 13 and 15. As explained in more detail below with reference to FIG. 2, the magnetic fields of both annular magnets 11 and 12 are also detected by two further redundant SMD magnetic field sensors 14 and 16.

The entire rotation angle detection operation is housed in the electronic system housing 18, the housing wall 19 of which is configured as a single piece with the throttle valve housing 2. A cover 20 closes the electronic system housing 18 off from the outside. The cover 20 has cooling ribs to dissipate the heat losses occurring in the electronic system housing 18.

Figure 2:
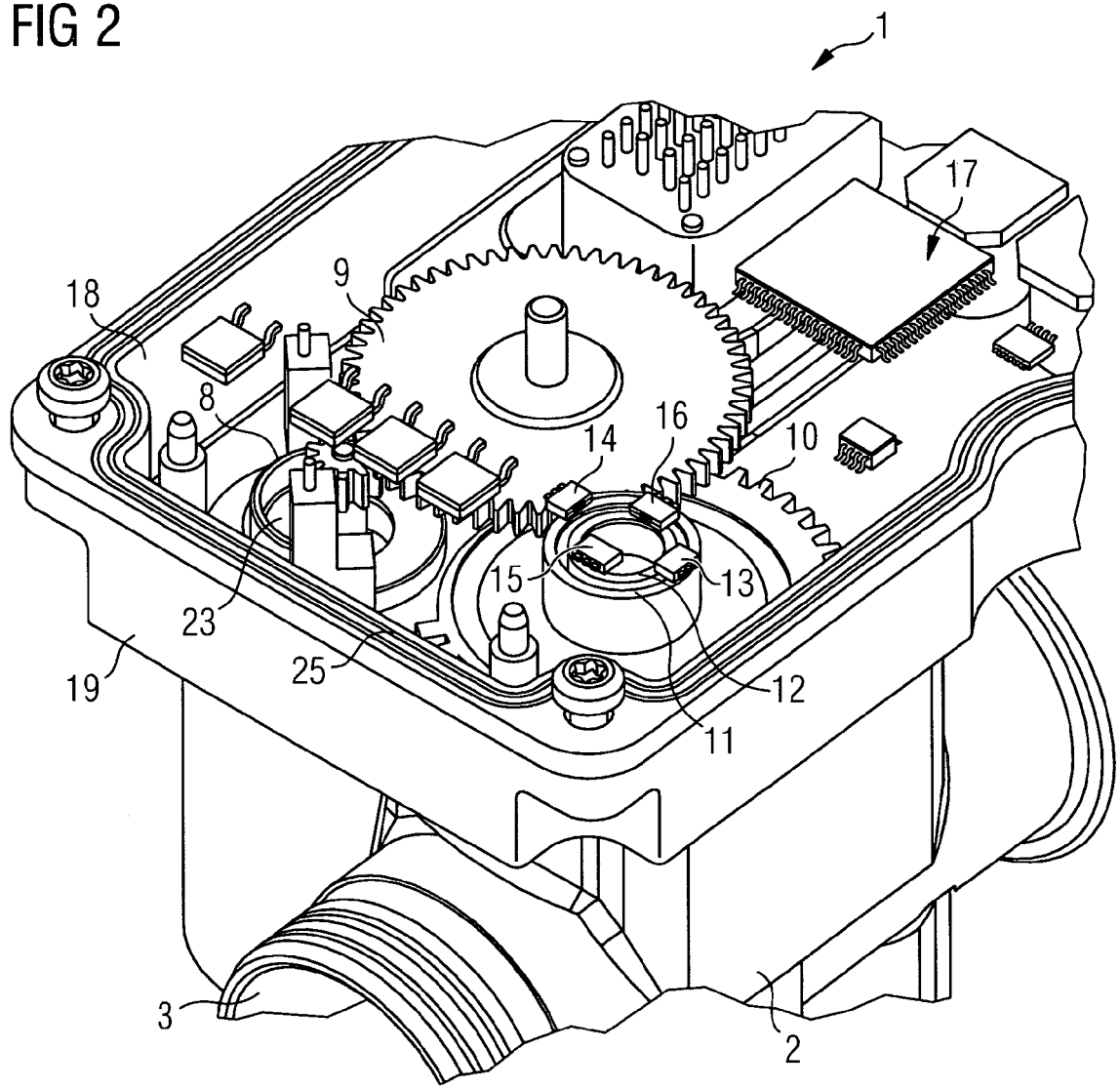
FIG. 2 shows the throttle valve operated by means of an electric motor in FIG. 1 with the cover part raised, showing the rotation angle detection.

In FIG. 2 the cover 20 is raised, showing the rotation angle detection. For greater clarity the printed circuit board 23 is not shown here, but the electronic components thereon are shown by way of example. FIG. 2 by way of example shows a processor 17 on the upper face and the SMD field magnet sensors 13, 14, 15, 16 on the lower face of the printed circuit board 23 (not shown here).

The SMD magnetic field sensors 15 and 16 generate an electric signal as a function of the angle of rotation of the setpoint value sensor shaft 7. This signal corresponds to the setpoint power value predetermined manually on the part of the driver. The SMD magnetic field sensors 13 and 14 detect the rotational position of the permanent magnet 11, that is to say the rotational position of the throttle valve shaft 4 and therefore of the throttle valve 5 in the intake pipe 3.

Both signals are generated by redundantly present Hall sensors 13, 14, 15, 16 and are routed on conductor paths (not shown in detail) directly to the processor 17. These position signals along with a plurality of further operating parameters are evaluated in the processor 17. The processor 17 actuates the electric motor 24. A toothed drive wheel 8 is fixed to the motor shaft of the electric motor 24 and engages with a toothed output wheel 9, which in turn acts on the toothed segment wheel 10 of the throttle valve shaft 4 by way of a further toothed wheel (not shown in detail in FIG. 2). The position of the throttle valve 5 in the intake pipe 3 can thus be predetermined, i.e. regulated, based on a program code running in the processor 17. One object of this regulation can be for example to keep exhaust gas values of the internal combustion engine within specific limits.

Figure 3:
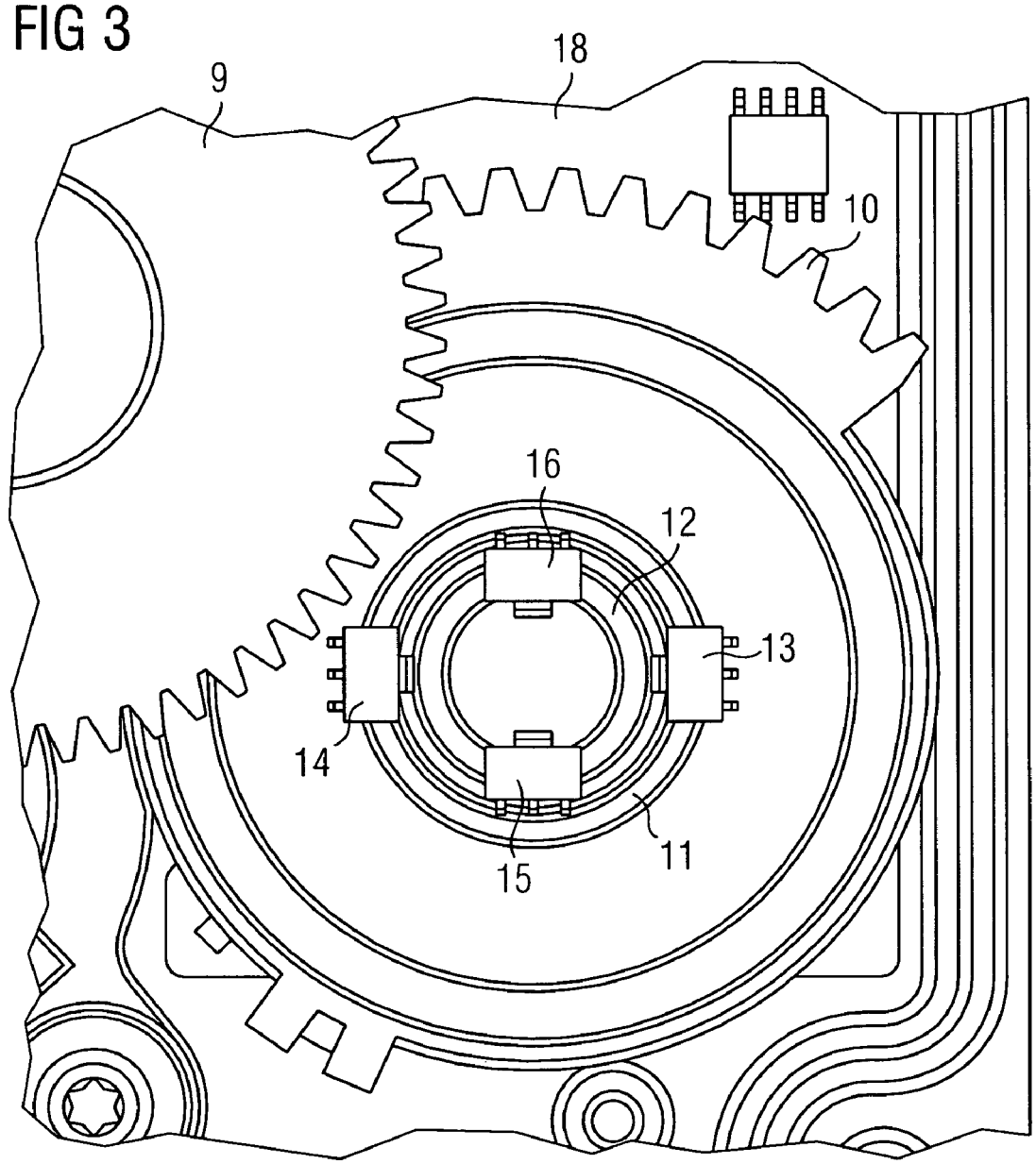
FIG. 3 shows a section of the throttle valve operated by means of an electric motor according to FIG. 1, looking down on the rotation angle detection.

FIG. 3 again shows the rotation angle detection from above. The coaxial arrangement of the two annular magnets about the axis 21 is shown very clearly. Unwanted mutual influencing of magnetic fields of the magnet rings 11 and 12, which falsify the measurement signal, can be corrected computationally by the microprocessor. The permanent magnets are embodied with two poles and are magnetized axially. The annular magnet 11 together with the toothed wheel segment 10 forms one part, which is produced by twin-component injection molding. Axial field magnetization takes place during production in the injection molding mold.

The invention allows the electronic components of the actuating facility to be integrated in a common housing 18.

This electronic system housing 18 is sealed off from the outside by means of a single seal 25. A radial shaft sealing ring 27 forms a seal between the hollow shaft 4 and the housing 2. The overall sealing of the electronic system housing 18 corresponds to IP68. This integrated structure dispenses with the cable guides and plug-type connectors hitherto required.

The throttle valve housing 2 can be produced cost-effectively from a metallic material or plastic using injection molding technology, the housing wall 19 of the electronic system housing 18 being injection molded at the same time as the throttle valve housing 2.

The invention claimed is:

1. A device for detecting the angle of rotation of a throttle valve operated by an electric motor, comprising:
   a throttle valve shaft configured as a hollow shaft;
   an intake system;
   a throttle valve housing, the device being supported in a rotatable manner on the throttle valve shaft in the intake system of the throttle valve housing;
   a servomotor coupled to the throttle valve shaft;
   an electronic control unit, the servomotor being controlled by the electronic control unit, the electronic control unit predetermining the rotational position of the throttle valve;
   a manually operatable setpoint value input apparatus, a setpoint value of the rotational position of the throttle valve being predetermined by the manually operatable setpoint value input apparatus and being supplied to the electronic control unit;
   a setpoint value sensor shaft coupled to the manually operatable setpoint value input apparatus, the setpoint value sensor shaft being arranged coaxially and rotatably in the hollow throttle valve shaft so that a rotational position of the setpoint value sensor shaft corresponds respectively to the manually predetermined setpoint value of the rotational position of the throttle valve,
   wherein one end of the throttle valve shaft and one end of the setpoint value sensor shaft extend out of a first side of the throttle valve housing, a first permanent magnet being arranged at the end of the throttle valve shaft and a second permanent magnet being arranged at the end of the setpoint value sensor shaft, and
   wherein for detection of magnetic fields of the first and second permanent magnet a magnetic field sensor arrangement is provided generating an angle-dependent electric signal respectively of the rotational position of the throttle valve and of the rotational position of the setpoint value sensor shaft and each of these signals being supplied to the electronic control unit.

2. The device as claimed in claim 1, wherein the first and second permanent magnet is configured as an annular magnet.

3. The device as claimed in claim 2, wherein each annular magnet has two axially magnetized poles.

4. The device as claimed in claim 2, wherein the magnetic field sensor arrangement is arranged on a main surface of a flat circuit support facing toward the end faces of the annular magnets.

5. The device as claimed in claim 3, wherein the magnetic field sensor arrangement is arranged on a main surface of a flat circuit support facing toward the end faces of the annular magnets.

6. The device as claimed in claim 4, wherein the flat circuit support is a printed circuit board on which the magnetic field sensor arrangement and the electronic control unit are arranged.

7. The device as claimed in claim 5, wherein the flat circuit support is a printed circuit board on which the magnetic field sensor arrangement and the electronic control unit are arranged.

8. The device as claimed in claim 6, wherein the magnetic field sensor arrangement is formed by two SMD magnetic field sensors, each arranged diametrically opposite one another on a circle.

9. The device as claimed in claim 7, wherein the magnetic field sensor arrangement is formed by two SMD magnetic field sensors, each arranged diametrically opposite one another on a circle.

10. The device as claimed in claim 6, wherein the end of the hollow throttle valve shaft and the end of the sensor shaft are inserted in a common manner into a housing of the electronic control unit, the printed circuit board being arranged in the housing.

11. The device as claimed in claim 8, wherein the end of the hollow throttle valve shaft and the end of the sensor shaft are inserted in a common manner into a housing of the electronic control unit, the printed circuit board being arranged in the housing.

12. The device as claimed in claim 10, wherein the housing of the electronic control unit has a housing wall, the housing wall and the throttle valve housing being produced as a single piece.

13. The device as claimed in claim 11, wherein the housing of the electronic control unit has a housing wall, the housing wall and the throttle valve housing being produced as a single piece.

14. The device as claimed in claim 10, wherein the housing of the electronic control unit has a housing cover functioning as a cooling system.

15. The device as claimed in claim 12, wherein the housing of the electronic control unit has a housing cover functioning as a cooling system.

16. The device as claimed in claim 1, wherein a mechanical coupling between the servomotor and throttle valve shaft is produced by way of toothed wheels, and wherein a toothed wheel or toothed wheel segment is connected to an end face of the first permanent magnet.

17. The device as claimed in claim 16, wherein the toothed wheel or toothed segment wheel is configured as a single piece with the first permanent magnet.

18. The device as claimed in claim 17, wherein the first permanent magnet and the toothed wheel or toothed segment wheel are produced using twin-component injection molding technology.

19. The device as claimed in claim 1, wherein a cable wheel is fixed to the end of the setpoint value sensor shaft opposite the first side of the throttle valve housing, the cable wheel being connected to a throttle lever on a steering system of a motorcycle by way of a Bowden cable.

20. The device as claimed in claim 1, wherein a cable wheel is fixed to the end of the setpoint value sensor shaft opposite the first side of the throttle valve housing, the cable wheel being connected to a gas pedal arranged in the passenger compartment of a motor vehicle by way of a Bowden cable.

* * * * *